May 19, 1942.  F. B. LAUTZENHISER ET AL  2,283,375

CALCULATOR

Filed July 10, 1940  3 Sheets-Sheet 1

*Inventors*
*Fred B. Lautzenhiser*
*Salvatore Colacuori*

By Paul O. Pippel
*Att'y.*

May 19, 1942.  F. B. LAUTZENHISER ET AL  2,283,375
CALCULATOR
Filed July 10, 1940  3 Sheets-Sheet 2

Inventors
Fred B. Lautzenhiser
Salvatore Colacuori
By Paul O. Pippel
Att'y.

May 19, 1942.　　F. B. LAUTZENHISER ET AL　　2,283,375
CALCULATOR
Filed July 10, 1940　　　3 Sheets-Sheet 3

Inventors
Fred B. Lautzenhiser
Salvatore Colacuori
By Paul O Pipper
Att'y.

Patented May 19, 1942

2,283,375

UNITED STATES PATENT OFFICE 2,283,375

CALCULATOR

Fred B. Lautzenhiser, Chicago, and Salvatore Colacuori, Riverside, Ill., assignors to International Harvester Company, a corporation of New Jersey Application July 10, 1940, Serial No. 344,720

7 Claims. (Cl. 235—61)

This invention relates to a calculator. The invention relates particularly to a calculator for computing the performance characteristics of a motor vehicle.

The invention contemplates and has for its principal object the provision of a calculating device comprising an element provided with a plurality of scales, each representing a particular variable corresponding to variations in a particular phase of design of the vehicle. The calculator includes at least one movable indicator adapted to be positioned with respect to certain of the scales for designating an unknown value on one scale according to the relation between a given value on another scale and a given value on a third scale.

An important object is to provide the movable indicating means for the purpose of accuracy and simplicity in ascertaining factors related to and derived from other factors represented by variables on the scales.

An important object is to provide each scale with a plurality of indicia, each representing a different characteristic of a particular class or group; to provide a second scale with similar indicia of a second class or group; to provide a third scale having similar indicia in a third class or group; and, to relate each scale to the others, so that, given two points or factors respectively in two scales, the third factor may be found in the third scale.

Another object is to relate the scales so that the indicator may be moved to any position intersecting one of the scales to represent the intersection of lines projected from points on other scales, whereby the point of intersection may be further projected to designate or denote an unknown value or factor.

And, still another object is to provide a calculator as a flat faced element having its face marked by a plurality of intersecting lines to form a series of horizontal and vertical lines along which the various values or factors may be traced from one scale to others.

Other objects and features of the invention will appear as the disclosure is more fully made.

Figure 1:
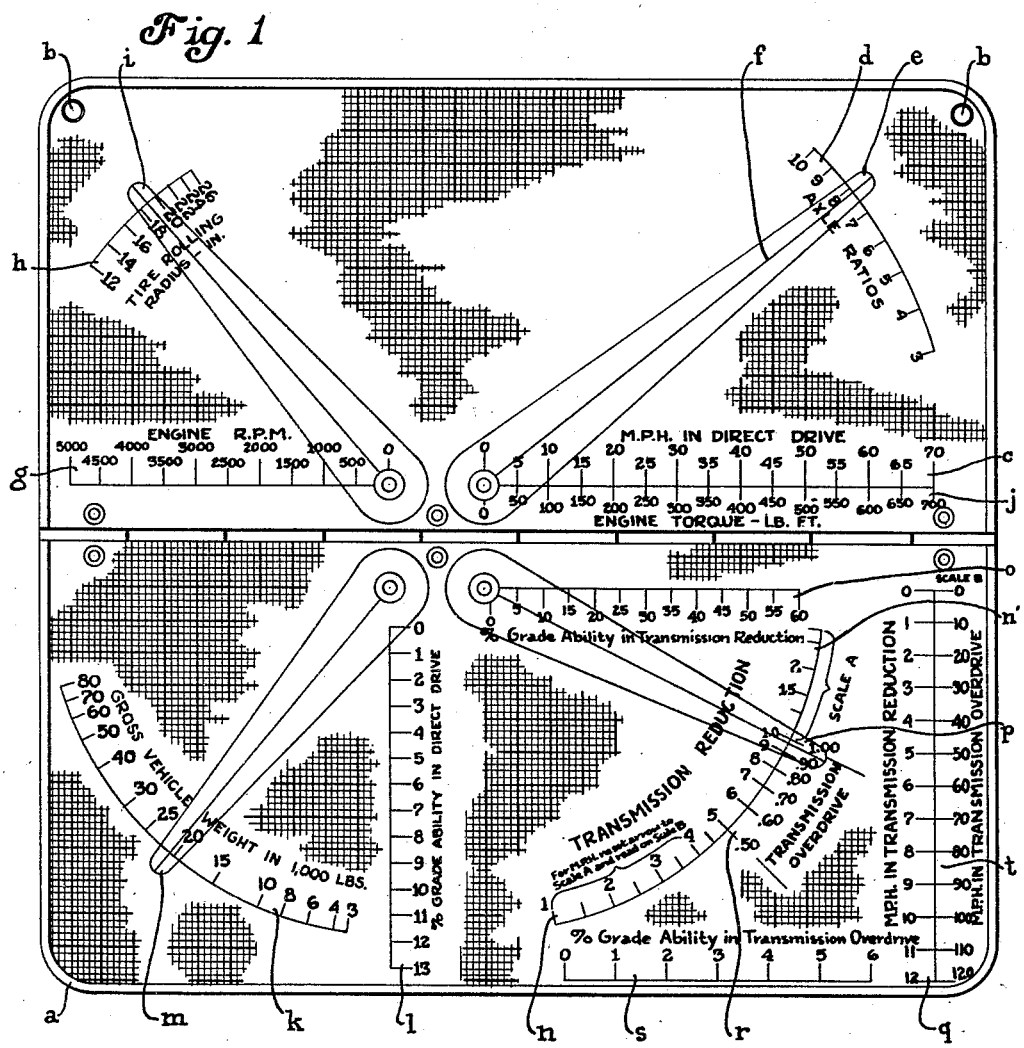
Figure 1 is a face view of the calculator.
Figure 2:
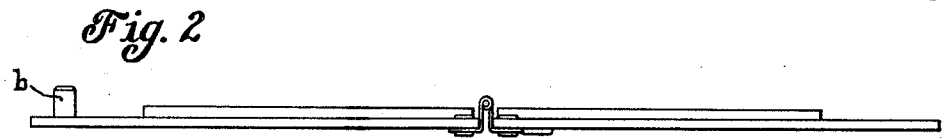
Figure 2 is an end elevational view of the calculator in open position.
Figure 3:
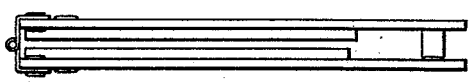
Figure 3 is an end elevation of the calculator as shown when closed.

As best shown in Figures 1, 2, and 3, the calculator comprises a two-part element $a$ hinged across its center to enable the calculator to be folded when not in use. One part of the element carries a pair of stops $b$ adapted to abut the other part of the element when the device is closed, as shown in Figure 3. As shown in Figure 1, the face of the calculator is provided with a plurality of horizontal and vertical intersecting lines to provide generally a face simulating what is commonly known as "graph" paper. The purpose of this feature will presently appear. The element is provided in its upper part at the right side thereof with a scale $c$ including indicia or values of a variable representing, and designated in the drawings as, "miles per hour in direct drive." The same portion of the element, in the upper right-hand corner thereof, is provided with a second scale $d$, preferably arranged about an arc, as shown, and including indicia or values of a variable representing different axle ratios. A movable indicator or pointer $e$ is pivotally carried for swinging movement across the face of the calculator toward and away from the scale $c$ and intersecting the scale $d$. The indicator is preferably formed of transparent material and is provided with a guide line $f$, which line is visible through the pointer and which cooperates with the scales and the vertical or horizontal lines marked on the face of the element $a$.

The upper part of the element is provided, at its left-hand side, with a third scale $g$ including indicia or values of a variable representing revolutions per minute of the vehicle engine. A fourth scale $h$ is spaced from scale $g$ and is disposed in the upper left-hand corner of the element $a$. This scale is preferably arcuate and includes indicia or values of a variable representing various tire rolling-radii in inches. A second pointer $i$ is pivoted at its lower right-hand end adjacent the pivot point of the pointer $e$ and is movable over the face of the calculator toward and away from the scale $g$ and intersecting scale $h$. This indicator or pointer is likewise transparent and includes a guide line cooperable with the scales and the face markings of the element $a$.

The upper right-hand part of the element $a$ includes a fifth scale $j$, provided with indicia representing a variable corresponding to the engine torque in foot pounds.

The lower half of the element $a$ is provided at its left-hand corner with an arcuate scale $k$ including indicia or values of a variable representing gross vehicle weight in units of 1000 pounds. This portion of the element is also provided with a vertical scale $l$ including indicia representing in percentages various grades or inclines of the highway. These percentages are calculated on the basis of operation of the vehicle with the transmission in direct drive, wherein the ratio between the crank shaft and the propeller shaft of the vehicle is 1 to 1.

The lower right-hand portion of the element $a$ is provided with a plurality of scales including further variations on those previously described, so that grade ability and road speed may be ascertained when the vehicle is operated with its transmission gearing shifted to reduce or increase the ratio between the engine and the propeller shaft. A pointer $m$ is pivoted at its upper right-hand end to the element $a$ and is adapted to be moved across the face of the calculator, as indicated.

For the purpose of ascertaining grade ability and road speed of the vehicle when the vehicle is operated with its transmission delivering power in different ratios, the lower right-hand portion of the calculator is provided with scales representing variables according to the variations of the factors determinable from scales $c$ and $l$, described above. This portion of the calculator includes an arcuate scale $n$ designating the different ratios at which the transmission is capable of delivering power. This scale represents the transmission speed in "reduction"; that is to say, when the transmission is shifted so that the engine speed is greater than the speed of the propeller shaft. For the purpose of convenience and for providing a fool-proof device, the scale $n$ includes a second scale portion or sub-scale $n'$, designated on the drawings as "Scale A." It will be noted that the figures included within the sub-scale $n'$ are numerically like those included between the bracketed portion at the lower left-hand end of the scale $n$. The function of this scale in relation to the others will appear later.

Another scale $o$ is disposed horizontally across the right-hand portion of the lower part of the element, generally paralleling the hinge between the element parts, and represents grade ability factors according to the operation of the vehicle in "transmission reduction." A pointer or indicator $p$, preferably transparent, as are the others, is pivoted at one end to the element $a$ and intersects the scale $n$.

A vertical scale $q$, disposed adjacent the right-hand edge of the lower part of the element $a$, and designated in the drawings as "miles per hour in transmission reduction," includes variables corresponding to the factors obtained in computing road speed of the vehicle when operated in "transmission reduction."

Since the vehicle may be provided also with a transmission over-drive, wherein the speed of the propeller shaft is increased over that of the crank shaft, the calculator is provided with a plurality of related scales for ascertaining further factors of road speed and grade ability. A scale $r$ is provided on the same arc as scale $n$ and includes indicia representing various overdrive ratios. A scale $s$, representing various values of grade ability in transmission over-drive, is disposed along the lower edge at the right-hand side of the lower part of the element $a$. A final scale $t$ parallels the scale $q$ and represents various values of road speed in transmission over-drive. The scale $t$ is designated on the drawings as "Scale B." The bracketed portion of the scale $n$ is provided, as indicated in the drawings, with instructions with respect to the resetting of the arrow (pointer $p$) to "Scale A" ($n'$) for the purpose of reading the required factors or values on "Scale B" ($t$). The characteristics and relation between the various scales will appear from the following description of the use of the calculator.

Figure 4:
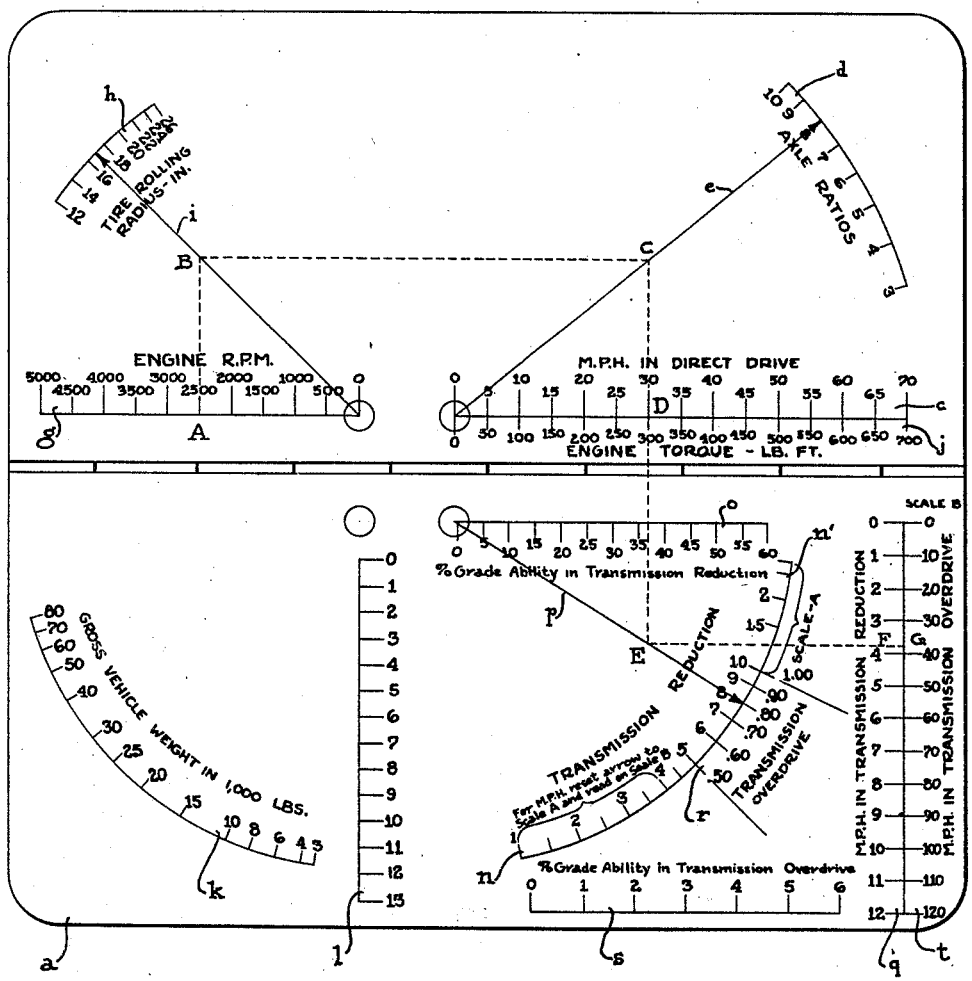
Figure 4 is a face view of the calculator, illustrated diagrammatically, to demonstrate the use thereof in determining one particular performance characteristic; and, Figure 5 is a similar view demonstrating the determination of another particular performance characteristic.

While it is a relatively simple matter to compute the road speed of a vehicle when given its engine R. P. M., tire rolling-radius in inches, and the ratio of its rear axle, the arithmetical computation becomes burdensome because of the variation in each of these factors according to the particular vehicle stated. Accordingly, the present invention provides a simplified device enabling rapid determination of road speed for any vehicle having the required factors falling within the scopes of the respective scales. The scales $c$, $d$, $g$, and $h$ are so related that setting of the indicators $f$ and $i$ to any given value on the scales $d$ and $h$ according to a given value on the scale $g$, will locate an unknown value on scale $c$. It will be appreciated that, in the event that a certain value remains constant, one scale may be eliminated for the purpose of operating the device. The scales just mentioned are related according to the formula:

$$\frac{RPM \times R}{A \times K} \times TR \text{ equals } MPH$$

in which:

RPM = engine revolutions per minute
R = tire rolling-radius
A = axle ratio
K = constant (168)
MPH = vehicle miles per hour
TR = transmission ratio Assuming that the engine R. P. M., tire rolling-radius, and axle ratio are given, to find the road speed on scale $c$, the following procedure is adopted:

The indicator $i$ is set so that its guide line registers with the given tire rolling-radius on scale $h$. A line is projected vertically from the given engine R. P. M. until it intersects the guide line on the pointer $i$. The pointer $e$ is set so that the guide line thereon registers with the given axle ratio on the scale $d$. A line is projected horizontally between the intersection of the projection of the engine R. P. M. with the guide line of the pointer $i$ until it intersects the guide line $f$ of the pointer $e$. A line is then projected downwardly from this last intersection and the value thereof is read on scale $c$. An illustration of this procedure is shown in Figure 4. In this particular example there are given an engine R. P. M. of 2500, a tire rolling-radius of 17 inches, and an axle ratio of 8 to 1. A line is traced, as dotted on the drawings, from the point A (RPM) to B, and thence to C, and from there to D. There is thus obtained the road speed of the vehicle in direct drive; that is, when the speeds of the crank shaft and the propeller shaft are equal. It will be appreciated that variations of this operation can be followed, depending upon which factor of the four referred to is unknown. In the event that the road speed, axle ratio, and tire rolling-radius are known and it is desired to determine the engine R. P. M., it is necessary merely to reverse the procedure outlined above. The same procedure is followed with obvious variations when either the tire rolling-radius or axle ratio is unknown.

Assuming that the same values as stated before are known (and the road speed and direct drive has now been determined) it may become necessary to determine the road speed with the transmission in reduced or overdrive ratio. Accordingly, the indicator $p$ is set on the scale $n$ to the given transmission reduction ratio, which, as illustrated in the drawings, is 8 to 1. The line between the points C and D is carried down until it intersects the guide line on the pointer $p$, which pointer has already been set. This point is designated at E in the example illustrated in Figure 4. A horizontal line is then projected from this intersection across the element to the scale $q$, to the point F. The road speed of the vehicle in transmission reduction is thus determined.

In the event that the vehicle is operating in transmission overdrive, the pointer $p$ is set in accordance with a given value on the scale $r$. In the example illustrated in the drawings, this point is at a point on the scale $r$ directly opposite the point on the scale $n$ designating transmission reduction. In this case the transmission overdrive ratio is .8 to 1; that is, the propeller shaft rotates once to each .8 revolution of the crank shaft. The horizontal line connecting the intersection of an extension of the line C—D and the pointer $p$ is extended across to the scale $t$, designated in Figure 4 as G. The road speed of the vehicle in transmission overdrive is thus determined. It is obvious, of course, that this speed is 10 times as great as the speed of the vehicle in transmission reduction because the latter ratio is $\frac{1}{10}$ that of the overdrive ratio.

As previously mentioned in connection with the description of the method of ascertaining any of the factors A, B, C, or D, certain factors related to the factors E, F, or G may be variously determined according to which of these factors is unknown. The following table will illustrate the flexibility of the device in determining these factors:

*Table I*

1. M. P. H. in direct transmission, read A—B—C—D.
2. M. P. H. in overdrive, read A—B—C—E—G.
3. M. P. H. in reduction (1.00 to 4.00), read A—B—C—E—G.
4. M. P. H. in reduction (4.00 to 10.00), read A—B—C—E—F.
5. R. P. M. in direct, read D—C—B—A.
6. R. P. M. in overdrive, read G—E—C—B—A.
7. R. P. M. in reduction (1.00 to 4.00), read G—E—C—B—A.
8. R. P. M. in reduction (4.00 to 10.00), read F—E—C—B—A.
9. Axle ratio in direct, read A—B—D, then intersection at C. Place indicator at C and read axle ratio.
10. Axle ratio in overdrive, read A—B—G—E, then intersection at C. Place indicator at C and read ratio.
11. Axle ratio in reduction (1 to 4), read A—B—G—E, then intersection at C. Place indicator at C and read ratio.
12. Axle ratio in reduction (4 to 10), read A—B—F—E, then intersection at C. Place indicator at C and read ratio.

Figure 5:
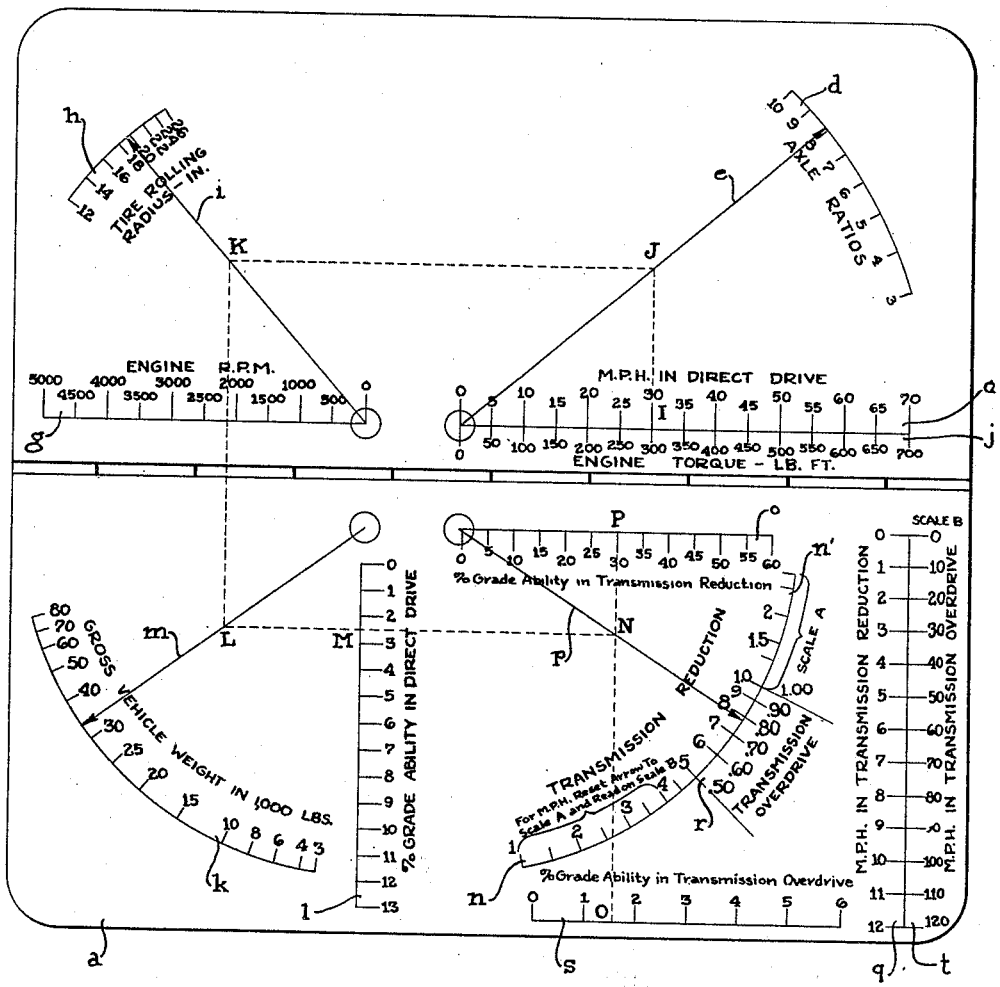

Referring now to Figure 5, the following description pertains to the method of ascertaining the grade ability of the vehicle in direct drive, transmission reduction, or overdrive.

In determining the positions of the scales $k$, $l$, $n$, $o$, and $r$ with respect to the scales $j$ (engine torque), $d$, and $h$, the following formula is used:

$$\frac{T \times 12 \times A \times TR \times E}{R \times W} = TF$$

TF minus RF equals GA in which—

GA = grade ability
T = torque in lbs. ft.
A = axle ratio
TR = transmission ratio
E = efficiency factor
R = tire rolling-radius
W = gross vehicle weight
TF = tractive factor
RF = road resistance factor In determining the grade ability for a vehicle where certain values are given, it is to be understood that road speed and engine speed are immaterial. Accordingly, grade ability is determined by the relation of the factors of engine torque, axle ratio, tire rolling-radius, and gross vehicle weight. The transmission ratios accordingly enter in when those factors are present in the vehicle. The scales $l$, $o$, and $s$ are arranged on the calculator in positions compensating for the road resistance factor as computed in accordance with the usual road conditions. The particular factor chosen in the present case is .015. It will be understood, of course, that this factor will vary in accordance with the condition of the particular road over which the vehicle is operated, so that the resistance factor will become less as the type of road becomes better, and, conversely, the factor will increase as road conditions become poorer.

Figure 5 illustrates an example of the method of determining the grade ability of a vehicle according to the given factors of axle ratio, engine torque, gross vehicle weight, and tire rolling-radius, the vehicle being operated in direct drive. The disposition of the scales $d$ and $j$ is such as to take into consideration the transition of ft. lbs. to inch lbs. Beginning on the scale $j$ at a given engine torque value, indicated in Figure 5 at I, a vertical line is projected to intersect the guide line on the pointer $e$, which has been previously set to the given axle ratio value (in this instance, 8 to 1). The intersection is designated at J, from which a horizontal line is projected to the left until it intersects the guide line on the pointer $i$, which has already been set to the tire rolling-radius value. This point is indicated in Figure 5 at K. The pointer $m$, at the lower left-hand corner of the calculator, has been set to a given gross vehicle weight value. A vertical line is then projected down from K to intersect the guide line on the pointer $m$ at L, and from thence a line is projected to scale $l$ where it will designate the grade ability of the vehicle, as at M in Figure 5. As previously mentioned, this grade ability is the tractive factor of the vehicle minus a selected road resistance factor (.015).

The foregoing description pertains to the method of determining the grade ability of the vehicle with its transmission in direct drive. In order that the grade ability of the vehicle may be determined when the vehicle transmission is in either reduction drive or overdrive, the pointer $p$ is brought into play to correlate scales $n$ and $o$ and $r$ and $s$, respectively. Setting the pointer $p$ on the required value on scale $n$, a line is projected from L across to the intersection of the guide line on the pointer, and a vertical line is extended from this last intersection upwardly to the scale $o$. These lines are designated in Figure 5 as LN and NP. A similar procedure is followed for determining the grade ability of the vehicle in transmission overdrive. The line extended from L is directed to the pointer $p$ and thence downwardly at right angles thereto to the scale $s$. These lines are designated in the drawings on Figure 5 as LN and NO.

Reference was previously had to the division of the scale $n$ into two parts. As will best appear from the showing in Figure 1, it will be seen that the bracketed portion of the scale $n$ is so disposed that, should the pointer $p$ be arranged at any of the values thereon, a projection from a critical intersection would, in certain instances, run off the face of the calculator. As an example of this particular peculiarity, let it be assumed that the pointers $e$ and $i$ are arranged as shown in Figure 4, and that the engine RPM (scale $g$) is also as shown. Then, assume that the transmission reduction value is a ratio of 2 to 1. In this case, if the pointer $p$ should be set at 2 on scale $n$, it will be seen that a line projected from C downwardly to the guide line of the pointer $p$ would not intersect the pointer on the face of the scale. Accordingly, the sub-scale $n'$ is provided for the purpose of permitting resetting of the pointer $p$ to a corresponding value on that sub-scale. As indicated in the drawings, appropriate directions are provided on the face of the calculator for the purpose of accomplishing this end. In this instance, the road speed is read not on the scale $q$, but on the scale $t$, further designated on the drawings as "Scale B." It will be understood, of course, that the sub-scale portion $n'$ may be omitted if the calculator is provided with a larger area in its lower right-hand portion.

It was previously stated, with reference to Table I, that any one factor could be determined if the others were given. The same feature exists with reference to the cross-determination of any of the values referred to in determining grade ability (I, J, K, L, M, N, O, P). For this purpose, the following table is supplied:

*Table II*

1. Grade ability in direct, read I—J—K—L—M.
2. Grade ability in overdrive, read I—J—K—L—N—O.
3. Grade ability in reduction, read I—J—K—L—N—P.
4. Engine torque required in direct, read M—L—K—J—I.
5. Engine torque required in overdrive, read O—N—L—K—J—I.
6. Engine torque required in reduction, read P—N—L—K—J—I.
7. Gross weight negotiable in direct, read I—J—K—M, then intersection at L. Place indicator at L. Read gross.
8. Gross weight negotiable in overdrive, read I—J—K—O—N, then intersection at L. Place indicator at L. Read gross.
9. Gross weight negotiable in reduction, read I—J—K—P—N, then intersection at L. Place indicator at L. Read gross.
10. Axle ratio required in direct, read I—M—L—K. Then at intersection J, place indicator and read ratio.
11. Axle ratio required in overdrive, read I—O—N—L—K. Then at intersection J, place indicator and read ratio.
12. Axle ratio required in reduction, read I—P—N—L—K. Then at intersection J, place indicator and read ratio.
13. Transmission overdrive, read I—J—K—L—O. Then at intersection N, place indicator and read ratio.
14. Transmission reduction, read I—J—K—L—P. Then at intersection N, place indicator and read ratio.

Referring again to the ability of the calculator to provide for the determination of vehicle road speed, it will be seen that the scales $g$, $h$, $d$, and $c$ are each provided with a plurality of values corresponding to certain characteristics of the vehicle. Each scale is consequently a variable in an equation, the solution to which is designated on one or the other of the four scales referred to, depending upon which value is unknown. Since each scale in itself represents a variable including a number of values, a multiplicity of equations and the solutions thereto are provided in a comparatively simple manner in a relatively compact area. As an example of the solution of any of the equations that may be set up, it can be assumed that certain of the values will remain constant, while one other will vary, with the result that the solution of the equation will correspondingly vary. Assuming, for example, that the engine R. P. M. and axle ratio remain constant, and it is desired to ascertain the road speed in accordance with tires of different sizes, the pointer $e$ can be set to remain at its selected value on the axle ratio scale $d$. An imaginary line is then projected vertically from the selected R. P. M. value. The pointer $i$ is then moved across the scale $h$ to the selected tire radii, and in each instance the intersection of the guide line on the pointer $i$ with the vertical line projected from the R. P. M. value is projected across until it intersects the pointer $e$. For each variation in the tire radius value a different horizontal line will result between the pointers $i$ and $e$, and correspondingly different vertical lines will be projectable downwardly from the intersections of the horizontal lines with the pointer $e$. It will thus be seen that with one value remaining constant, one of the scales may be eliminated for the purposes of the present calculation. In this instance there would remain the first, second, and third scales $h$, $g$ and $c$, and the pointer $i$ would be movable to intersect the first scale to designate different values of the variable represented by that scale, the scales being so related that, with the indicator intersecting this scale at any selected point thereon, a selected point on the second scale denoting a given value may be projected from the indicator to the third scale to a point thereon denoting the value of a third variable for the given values of the two variables represented respectively by the first and second scales. It will be understood, as demonstrated in Table I, that any three of the four values may be given and any one of the others may be unknown. As previously mentioned, the fact that one of the values is to remain constant throughout a certain series of calculations results in the elimination of one variable, and hence the particular equation would consist of a solution for the value related to two other values.

The foregoing description pertains to a particular embodiment of the invention. It will be understood, of course, that certain alterations and modifications may be made in the preferred arrangement without departing from the spirit and scope of the appended claims.

What is claimed is:

1. A calculator having a face provided with a ground line divided into first and second scales, each marked with indicia, a third scale arranged in non-parallel relation to the ground line at the first scale portion thereof and including indicia, a fourth scale arranged in non-parallel relation to the ground line at the second scale portion thereof and including indicia, a pivoted pointer provided with a guide line and movable over the third scale to any selected index thereon, said guide line on the pointer representing a line projected from said index to be intersected by a line projected from an index on the first scale at right angles to the ground line, a second pivoted pointer provided with a guide line and movable over the fourth scale to any selected index thereon, said guide line on the second pointer representing a line projected from said index to be intersected by a line extended from the first intersection parallel to the ground line and by a line projected at right angles to the ground line from an index on the second scale.

2. A calculator having a face provided with first and second scales, each marked with indicia, a third scale related to the first scale and including indicia, a fourth scale related to the second scale and including indicia, a pivoted pointer provided with a guide line and movable over the third scale to any selected index thereon, said guide line on the pointer representing a line projected from said index to be intersected by a line projected from an index on the first scale, a second pivoted pointer provided with a guide line and movable over the fourth scale to any selected index thereon, said guide line on the second pointer representing a line projected from said index to be intersected by a line extended from the first intersection and by a line projected from an index on the second scale.

3. A calculator having a face including a first scale, a second scale disposed in non-parallel relation to the first scale, a movable indicator adapted to be moved over the first scale to any selected point thereon and having a guide line designating a line extended from said point to intersect with a line extended from a selected point in the second scale, a third scale spaced from the first two, a fourth scale disposed at an angle to the third scale, and a second movable indicator adapted to be moved over the third scale to any selected point thereon and having a guide line designating a line extended from said point to intersect with a line extended from the first intersection, said second intersection designating an index on the fourth scale.

4. A calculator comprising an element having a face provided with a scale marked with indicia, an indicator movably carried on the element and including a guide, and a second scale on the face of the element spaced from the first scale and including indicia within the path of movement of the indicator, the indicator being registerable with a point on the second scale, said guide serving to represent a line extending from said point on the second scale to be intersected by a line projected from a selected index in the first scale, a third scale spaced from the first two and having indicia, a second indicator carried by the element for movement over the third scale and including a guide, and a fourth scale spaced from the third scale and having indicia, the guide on the second indicator being adapted to be registered with an index in the third scale and serving to represent a line to be intersected by a line projected from the aforesaid intersection and by a line projected to an index of the fourth scale.

5. A calculator comprising an element having a face provided with a scale marked with indicia, an indicator movably carried on the element, and a second scale on the face of the element disposed in non-parallel relation to the first scale and including indicia within the path of movement of the indicator, the indicator being registerable with a point on the second scale, said indicator serving to represent a line extending from said point on the second scale to be intersected by a line projected from a selected index in the first scale, a third scale spaced from the first two and having indicia, a second indicator movably carried by the element and including a guide, and a fourth scale disposed in non-parallel relation to the third and having indicia, the guide on the second indicator being adapted to be registered with an index in the third scale and serving to represent a line to be intersected by a line projected from the aforesaid intersection and by a line projected to an index of the fourth scale.

6. A device for calculating motor vehicle performance characteristics comprising an element having a face provided with a scale marked with indicia representing motor vehicle road speeds, an indicator movably carried on the element and including a guide, and a second scale on the face of the element spaced from the road speed scale and including indicia within the path of movement of the indicator and representing motor vehicle axle ratios, the indicator being registerable with a point on the axle ratio scale, said guide serving to represent a line extending from said point on the axle ratio scale to be intersected by a line projected from a selected index in the road speed scale, a third scale spaced from the first two and having indicia representing tire-rolling radii, a second indicator carried by the element for movement over the third scale and including a guide, and a fourth scale spaced from the tire radii scale and having indicia representing motor vehicle engine speeds, the guide on the second indicator being adapted to be registered with an index in the tire radii scale and serving to represent a line to be intersected by a line projected from the aforesaid intersection and by a line projected to an index of the engine speed scale.

7. A device for calculating motor vehicle performance characteristics comprising an element having a face provided with a scale marked with indicia representing motor vehicle road speeds, an indicator movably carried on the element and including a guide, and a second scale on the face of the element spaced from the road speed scale and including indicia within the path of movement of the indicator and representing motor vehicle axle ratios, the indicator being registerable with a point on the axle ratio scale, said guide serving to represent a line extending from said point on the axle ratio scale to be intersected by a line projected from a selected index in the road speed scale, a third scale spaced from the first two and having indicia representing tire-rolling radii, a second indicator carried by the element for movement over the third scale and including a guide, a fourth scale spaced from the tire radii scale and having indicia representing motor vehicle engine speeds, the guide on the second indicator being adapted to be registered with an index in the tire radii scale and serving to represent a line to be intersected by a line projected from the aforesaid intersection and by a line projected to an index of the engine speed scale, a fifth scale spaced from the engine speed scale and having indicia representing gross vehicle weight, a third indicator carried by the element for movement over the fifth scale and including a guide, and a sixth scale spaced from the vehicle-weight scale and having indicia representing ability of a vehicle to ascend a grade, the guide on the third indicator being adapted to be registered with an index in the vehicle-weight scale and serving to represent a line to be intersected by a line projected from the aforesaid intersection on the guide of the second indicator and by a line projected from the guide of said third indicator to an index of the grade-ability scale.

FRED B. LAUTZENHISER.
SALVATORE COLACUORI.